(No Model.)

E. L. MOORE.
DRINKING GLASS.

No. 293,190. Patented Feb. 5, 1884.

Attest;
J. Walter Fowler,
B. L. Towne

Inventor;
Edw. L. Moore
by R. K. Evans
his atty;

UNITED STATES PATENT OFFICE.

EDWARD L. MOORE, OF KNOXVILLE, TENNESSEE, ASSIGNOR TO HIMSELF AND THOMAS J. SMITH, OF CHICAGO, ILLINOIS.

DRINKING-GLASS.

SPECIFICATION forming part of Letters Patent No. 293,190, dated February 5, 1884.

Application filed January 4, 1884. (No model.)

*To all whom it may concern:*

Be it known that I, EDWARD L. MOORE, of Knoxville, in the county of Knox and State of Tennessee, have invented a new and Improved Glass Vessel for Drinking and other Purposes; and I hereby declare the following to be a full, clear, and exact description thereof, reference being had to the accompanying drawings, making part of this specification, in which—

Figure 1:
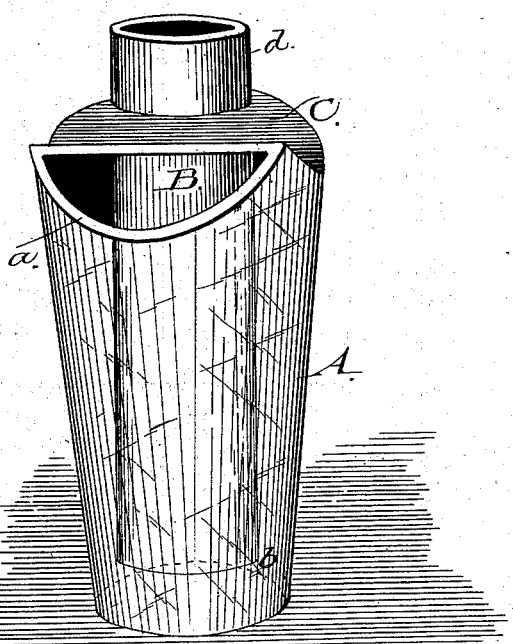
Figure 2:
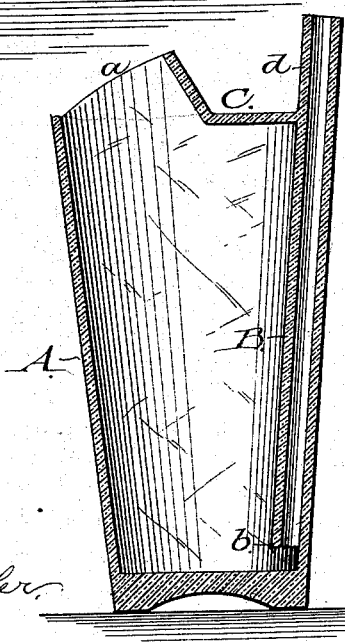

Figure 1 is a perspective view of the improved vessel. Fig. 2 is a vertical section of the same.

My invention relates particularly to glass drinking-vessels, and has for its object to facilitate the drinking of aerated or frothy beverages; and my invention consists in the details of construction of the glass vessel as hereinafter fully described, and specifically set out in the claim.

In order that those skilled in the art may make and use my invention, I will proceed to describe the exact manner in which I have carried it out.

In the said drawings, A is the body of the vessel, made of a cylindrical or other desired form; and $a$ is an opening, through which the glass or drinking vessel is to be filled.

From a point, $b$, within the glass, near its bottom, there passes along its wall or side a tube, B, integral with the cup, which is prolonged above the upper edge of the glass to form a mouth-piece, $d$. I have shown this tube elliptical in cross-section; but it may be made of any desired shape.

The top of the glass is partially covered by a flaring curved cover, C, to prevent the liquid escaping while the user is drinking through the mouth-piece $d$, and also to prevent any of the froth on the liquid from coming in contact with the lips or mustache of the drinker. As the user draws the liquid from a point comparatively near the bottom of the glass, where the contents are always in a liquid condition, he does not have to drink the foam or froth at all, it being deposited in the bottom of the glass as soon as all the liquid beneath it is withdrawn.

It is evident this vessel may be made of any desired material.

Having thus described my invention, what I claim as new, and desire to secure by Letters Patent, is—

As a new article of manufacture, the drinking-vessel having the body A, tube B, projecting mouth-piece $d$, cover C, and opening $a$, substantially as described.

EDWARD L. MOORE.

Witnesses:
THOMAS J. SMITH,
J. R. FITZHUGH.